No. 672,144. Patented Apr. 16, 1901.
S. S. BROKAW & R. H. WILEY.
SHAFT ATTACHMENT.
(Application filed Sept. 14, 1900.)
(No Model.)

Inventors:
S. S. Brokaw,
R. H. Wiley,
by Victor J. Evans
Attorney

Witnesses:

UNITED STATES PATENT OFFICE.

SAMUEL S. BROKAW AND ROBERT H. WILEY, OF FLUSHING, OHIO.

SHAFT ATTACHMENT.

SPECIFICATION forming part of Letters Patent No. 672,144, dated April 16, 1901.

Application filed September 14, 1900. Serial No. 30,085. (No model.)

*To all whom it may concern:*

Be it known that we, SAMUEL S. BROKAW and ROBERT H. WILEY, citizens of the United States, residing at Flushing, in the county of Belmont and State of Ohio, have invented new and useful Improvements in Shaft Attachments, of which the following is a specification.

Our invention relates to an attachment for vehicle-shafts, the object being to provide a device adapted to be attached to the front end of a shaft and designed to serve as a hitching device to attach the shaft to the hame, to also serve as a holdback, and, further, to support the shaft, thus avoiding the necessity of employing the usual shaft-holder.

The construction of the improvement will be fully described hereinafter in connection with the accompanying drawings, which form a part of this specification, and its novel features will be defined in the appended claim.

Figure 1:
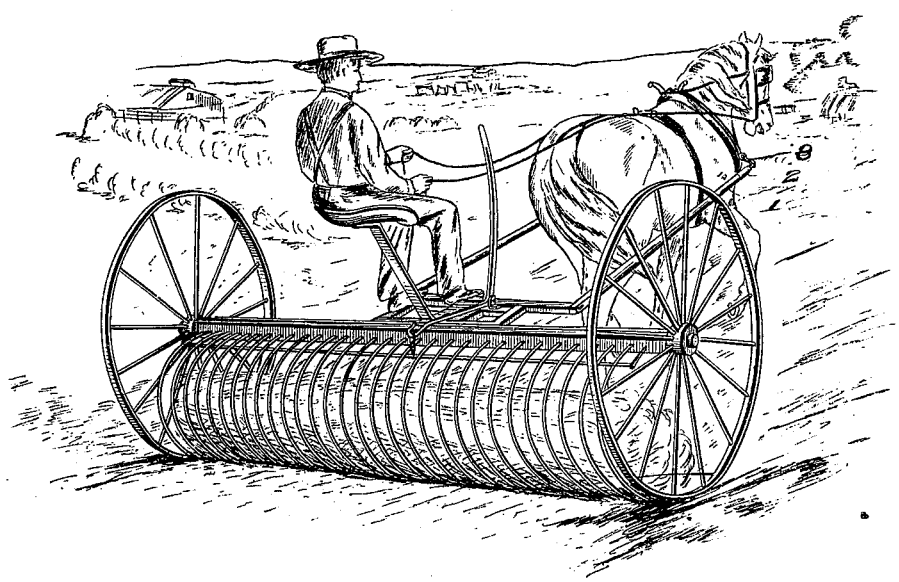
Figure 2:
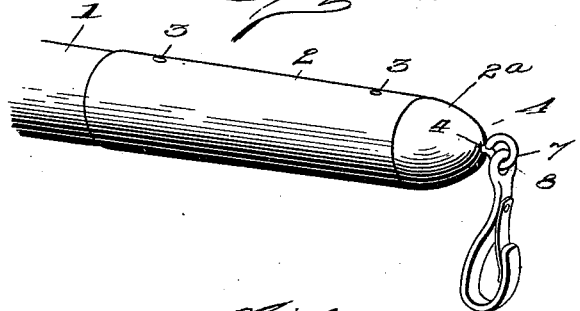
Figure 3:
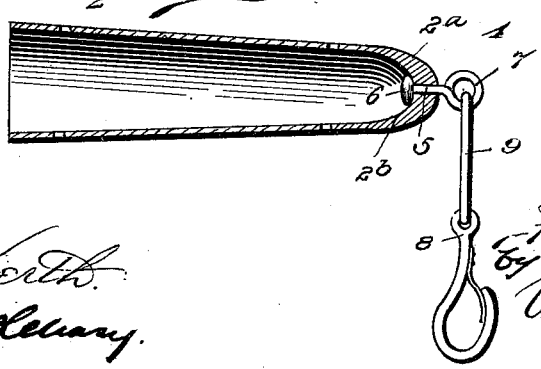

In the drawings, Figure 1 illustrates our invention applied to the shafts of a hay-rake. Fig. 2 is a view in perspective of the front end of one of the shafts with the improvement applied thereto, and Fig. 3 is a longitudinal section of the attachment detached from the shaft.

The reference-numeral 1 designates the shaft, over the end of which is secured a metallic socket or ferrule 2, which is secured in place by screws or bolts 3, extending transversely through the shaft 1 and ferrule 2, as clearly shown in Fig. 2. The outer end $2^a$ of the ferrule is closed and of tapering form and provided with an opening 4 to receive a swivel 5, having a head 6 on its inner end and an eye 7 at its outer end. To the eye 7 is attached the loop of a snap-hook 8. If desired, a loop 9 may be interposed between the eye 7 of the swivel and the snap-hook 8, as shown in Fig. 3. The inner surface $2^b$ of the tapered end of the ferrule is reinforced or formed with an annular enlargement against which the head 6 of the swivel bears.

The utility and operation of the device constructed as thus described will be readily understood.

Each of the shafts is provided with one of the improved attachments, and the snap-hooks are attached directly to the hame-rings, as illustrated in Fig. 1. The result of this attachment is that the shafts are secured firmly to the hame for the purpose of draft. The shafts are supported in their proper positions without the use of the usual harness shaft-holders, through which the shafts extend, and at the same time the attachment serves as a holdback device, thus entirely obviating the necessity of employing the usual breeching of the harness.

The improvement is especially well adapted for use upon hay-rakes and other agricultural machines, and its use results in an appreciable saving of time in hitching and unhitching and also materially reduces the number of parts of the harness required.

We claim—

An attachment for vehicle-shafts comprising a socket or ferrule adapted to fit over the end of the shaft, said ferrule being thickened or reinforced at its outer end and formed with an opening; in combination with an eye swiveled within the opening of the ferrule; and a snap-hook suspended from said eye.

In testimony whereof we affix our signatures in presence of two witnesses.

SAMUEL S. BROKAW.
ROBERT H. WILEY.

Witnesses:
CLARENCE HOBSON,
W. E. JUDKINS.